US007120793B2

(12) United States Patent
Hope et al.

(10) Patent No.: US 7,120,793 B2
(45) Date of Patent: Oct. 10, 2006

(54) SYSTEM AND METHOD FOR ELECTRONIC CERTIFICATE REVOCATION

(75) Inventors: Brian A. Hope, Sterling, VA (US); Adrian Filipi-Martin, Charlottesville, VA (US); Michael Smith, Charlottesville, VA (US)

(73) Assignee: GlobalCerts, LC, Richmond, VA (US)

( * ) Notice: Subject to any disclaimer, the term of this patent is extended or adjusted under 35 U.S.C. 154(b) by 677 days.

(21) Appl. No.: 10/255,299

(22) Filed: Sep. 26, 2002

(65) Prior Publication Data

US 2003/0079125 A1 Apr. 24, 2003

Related U.S. Application Data

(60) Provisional application No. 60/325,617, filed on Sep. 28, 2001.

(51) Int. Cl.
*H04L 9/32* (2006.01)
(52) U.S. Cl. .......................................... 713/158; 726/10
(58) Field of Classification Search ................ 713/158; 726/10
See application file for complete search history.

(56) References Cited

U.S. PATENT DOCUMENTS

| 5,666,416 A | 9/1997 | Micali |
| 5,687,235 A | 11/1997 | Perlman et al. |
| 5,699,431 A | 12/1997 | Van Oorschot et al. |
| 5,717,757 A | 2/1998 | Micali |
| 5,960,083 A | 9/1999 | Micali |
| 6,044,462 A | 3/2000 | Zubeldia et al. |
| 6,097,811 A | 8/2000 | Micali |
| 6,292,893 B1 | 9/2001 | Micali |
| 6,301,658 B1 | 10/2001 | Koehler |
| 6,301,659 B1 | 10/2001 | Micali |
| 6,381,627 B1* | 4/2002 | Kwan et al. ................. 709/201 |
| 6,397,329 B1 | 5/2002 | Aiello et al. |
| 6,487,599 B1 | 11/2002 | Smith et al. |

OTHER PUBLICATIONS

Zao et al., "A public-key based secure Mobile IP", Oct. 1999, pp. 373-390, obtained from http://portal.acm.org/citation.cfm?id=328740&coll=ACM&dl=ACM&CFID=56577140&CFTOKEN=14984179.*
Entrust, "Digital Signatures: How do they work?", Jun. 18, 2001, obtained from http://web.archive.org/web/20010618220448/http://www.entrust.com/digitalsig/howtheywork.htm.*
Network Working Group, Request for Comments: 2538, Eastlake & Gudmundsson, Storing Certificates in the DNS, Mar. 1999, pp. 1-10.
Network Working Group, Request for Comments: 2560, Myers, et al., X.509 Internet Public Key Infrastructure (OCSP), Jun. 1999, pp. 1-22.
Network Working Group, Request for Comments: 3280, Housley, et al., Internet X.509 Public Key Infrastructure (CRL), Apr. 2002, pp. 1-121.

* cited by examiner

*Primary Examiner*—Emmanuel L. Moise
*Assistant Examiner*—Jeffrey Popham
(74) *Attorney, Agent, or Firm*—Douglas W. Kim; McNair Law Firm, P.A

(57) ABSTRACT

A system and method of verifying whether a certificate has been revoked by providing a DNS responder containing a certificate revocation list (CRL), parsing the CRL into DNS zones, and distributing this information to the respective primary DNS responders based upon DNS zones. Information about a specific certificate is gathered by querying a DNS responder for certificate validation information, receiving such information, and reporting the results of the queries to a client software application so that the user of the system can be informed as to whether the certificate has been revoked or not.

20 Claims, 3 Drawing Sheets

SYSTEM AND METHOD FOR ELECTRONIC CERTIFICATE REVOCATION

This application claims priority on provisional patent application Ser. No. 60/325,617, entitled System and Method of Verifying Public Key Certificates for Revocation in a DNS Based Public Key Infrastructure, filed Sep. 28, 2001.

FIELD OF THE INVENTION

The present invention relates generally to the field of secure information transmission and, more particularly, to a method and system for electronic certificate revocation.

BACKGROUND OF THE INVENTION

Given the rapid expansion of the Internet, the widespread transmission of data and the ongoing concerns of privacy and security, cryptography, including the use of certificates, public, and private keys, is an area to which considerable attention must be directed. Additionally, maintaining the validity of electronic certificates is a crucial part of ensuring electronic security. The need for maintaining security exists in the transmission of e-mail, use of Secured Socket Layer (SSL), use of IP Secure (IPSec), use of Smart Cards, signing applets or other computer readable instructions, and software licensing.

E-mail can be digitally signed to ensure authentication of the sender. A certificate is used to validate the sender's identity. SSL is a protocol used to provide encrypted communications over the Internet. SSL is under the application layer (HTTP, SMTP, Telnet or FTP), and above the connection layer (TCP/IP), and relies upon certificates. IPSec is a protocol providing security for electronic transmissions at the packet level. IPSec is used to secure packets at the network layer traveling between two devices or peers as the authentication between them can rely upon certificates. Smart Cards use certificates to verify the private key on the smart card. Applet and code signing involves digitally signing the applet or code using certificates, either privately created, or received from a Certificate Authority, for validating signatures. Certificates can be used to help software vendors track licenses. A key can be provided to a customer downloading software, thereby allowing the customer to decrypt and use the downloaded software product. The customer provides identification information that is used to create a certificate for the customer. The keys that allow the customers to access the software are then bound to the certificate. Tracking the customer's certificate allows the reader to control the customer's ability to use the software. When the certificate is revoked, the customer can no longer use the software thereby allowing the vendor to control licensing.

In the above cases, electronic transmissions are made over an unsecure network. Therefore, when the transmission of data needs to be secured, the use of a certificate is often required. For this process to be secure, it is necessary to determine if the certificate is still valid, i.e.; that it has not been revoked.

A certificate is analogous to a passport, driver's license, or other identification means. It is used to prove the identity of an entity in a way that can be verified through a third party. For example, the United States State Department issues passports and has checks in place to ensure that the information contained on an issued passport properly and truthfully identifies the entity shown in the passport. A certificate authority ("CA") performs the same function for digital certificates as the State Department does for passports. To issue a certificate, the CA requires independently verifiable information to be submitted so that the identity of the certificate requesting entity can be known. Upon verification, the CA issues a certificate to the requesting entity and ties the certificate to the entity's identification. This can be achieved by having the requesting entity provide appropriate identification, and prove that they possess an associated private key. The certificate now serves as an electronic identification for that entity since it has been verified by a trusted third party.

Once a certificate has been issued to an entity, the certificate must be managed. For example, the entity's name or address may change, the entity may cease to exist, the certificate may need to be suspended or the entity may have lost the private key or the pass phrase that guards it. If these, or other events occur so that the identity is compromised, it may be desirable to revoke the certificate so that the certificate is no longer valid.

Traditionally, revocation under an X.509 compliant PKI involves contacting the CA that issued the certificate and requesting that the certificate be revoked. The certificate is then published in a certificate revocation list (CRL). The CRL contains the identification information of all certificates from that CA that have been revoked. However, it is up to a party wishing to validate a certificate to query the CRL from the CA. If the certificate that is the subject of the query is listed in the CRL, then it has been revoked. Generally, the CRL also contains the revocation date and time associated with a revoked certificate. Unfortunately, very few software applications that rely upon certificates actually perform the task of finding and checking the CRL for revoked certificates. Traditionally, the entire CRL of the CA must be downloaded by the software application in order to check for certificate revocation. Also, there are many CA's and the CRL must be downloaded from each CA. To compound the problem, CRL's are published in versions and updates so that to search a revoked certificate the most current CRL and any subsequent updates or addendums need be searched for all CA's. Therefore, the processing and transmission time for checking revocation is a difficult and computationally intensive task. While real-time checking does exist, these methods are neither sufficiently scalable nor simple to have obtained widespread use or support.

In further describing this invention, the following terms may be used:

Certificate—an electronic document used to identify an individual, a server, a company, or some other entity, and to associate that entity with a public key. Certificates generally contain identifying information about the certificate holder, an associated key and information about the Certificate Authority.

Certificate Authority—an entity that authenticates identities and issues certificates to those entities.

Domain Name System ("DNS")—a general purpose distributed data query service for translating host names into Internet addresses.

Public Key—one key of a key pair that is used to encrypt or decrypt a message or document and mathematically linked to a private key.

Private Key—one key of a key pair that is used to encrypt or decrypt a message or document encrypted with a public key and mathematically linked to the public key.

Public Key Infrastructure—a system for providing public and private key pairs as well as publishing public keys.

Validation—the process of determining whether a public key is still valid.

Authentication—the process of using a public key and certificate to determine that a transmission signed by the associated private key was actually sent from the named sender.

SUMMARY OF THE INVENTION

Therefore, it is an object of this invention to provide for an efficient and optimized method for insuring that a certificate has not been revoked so that trust is maintained within an encryption system.

It is another object of this invention to access revocation information using a DNS based system.

The present invention seeks to achieve these objects by providing A system for verifying the status of an electronic certificate having a serial number comprising a computer readable medium, a set of certificate revocation records, derived from a certificate authority, contained in the computer readable medium; and, a set of computer readable instructions embodied in the computer readable medium for receiving a certificate status request for the electronic certificate from a requesting party, querying the set of certificate revocation records having revocation information representing the status of the electronic certificate embodied in the computer readable medium according to the certificate status request, and, transmitting the revocation information to the requesting party if the certificate revocation record is successfully retrieve from the set of certificate revocation records so that the requesting party can be informed of the status of the electronic certificate. The set of computer readable instructions can include instructions for determining a fingerprint for the electronic certificate's issuer; appending the fingerprint to the serial number; formatting the fingerprint and appended serial number into a dotted decimal format; and, including the serial number and the fingerprint in dotted decimal format within the certificate status request. The computer readable medium is can be embodied in a primary DNS responder or a secondary DNS responder.

The set of computer readable instructions include instructions for receiving certificate revocation information from the certificate authority; parsing the certificate revocation information; adding revocation records to the set of certificate revocation records according to the certificate revocation information received from the certificate authority. Additionally, the certificate revocation information can be a certification revocation list provided by the certificate authority or other information from the Certificate authority.

The computer readable instructions include instructions for receiving a primary set of certificate revocation records from a primary DNS responder; and, updating the set of certificate revocation records according to the primary set of certificate revocation records. A digital signature can be associated with the computer readable medium so that the set of computer readable instructions can include instructions for digitally signing the revocation information with the digital signature association with the computer readable medium so that the requesting party can authenticate the revocation information.

Certificate state can also be verified with a computer readable medium; and, a set of computer readable instructions embodied within the computer readable medium for receiving a certificate revocation list from a certificate authority, creating a set of certificate revocation records, each having revocation information representing revoked electronic certificates, according to the certificate revocation list, organizing the set of certificate revocation records by DNS zone, and, making available the set of certificate revocation records to requesting parties so that the requesting party can determine the status of a particular electronic certificate organized by DNS zone. The electronic certificate has an associated serial number; and the set of computer readable instructions can include instructions for determining a fingerprint of the certificate authority, associating the fingerprint with the serial number for each certificate represented by the certificate revocation list, and, associating the fingerprint and the serial number within the set of certificate revocation records. The fingerprint and serial number can be formatted into a dotted decimal format and the set of computer readable instructions can include instructions for providing the set of certificate revocation records to at least one secondary DNS responder. A digital signature can be associated with the primary DNS responder; and, the set of computer readable instructions include instructions for electronically signing certificate revocation records with the digital signature prior to making available the set of revocation records to requesting parties.

The computer readable instructions can include instructions for creating a certificate status request having certificate authority information, querying a DNS responder for a DNS responder list representing DNS responders having a set of certificate revocation records according to the certificate authority information, receiving the DNS responder list, querying each DNS responder according to the certificate status request until a termination event is encountered, receiving certificate revocation information from the certificate revocation record from the queried DNS responders if the certificate revocation record is discovered, and, providing certificate revocation information according to the requesting party if the certificate revocation record is discovered so that the requesting party is provided the status of the certificate according to the certificate revocation request. The terminating event can be the discovery of a the certificate revocation record responsive to the certificate status request, the exhaustion of the DNS responder list or the exhaustion of a predetermined period of time in which the certificate revocation record is not discovered that is responsive to the certificate status request.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
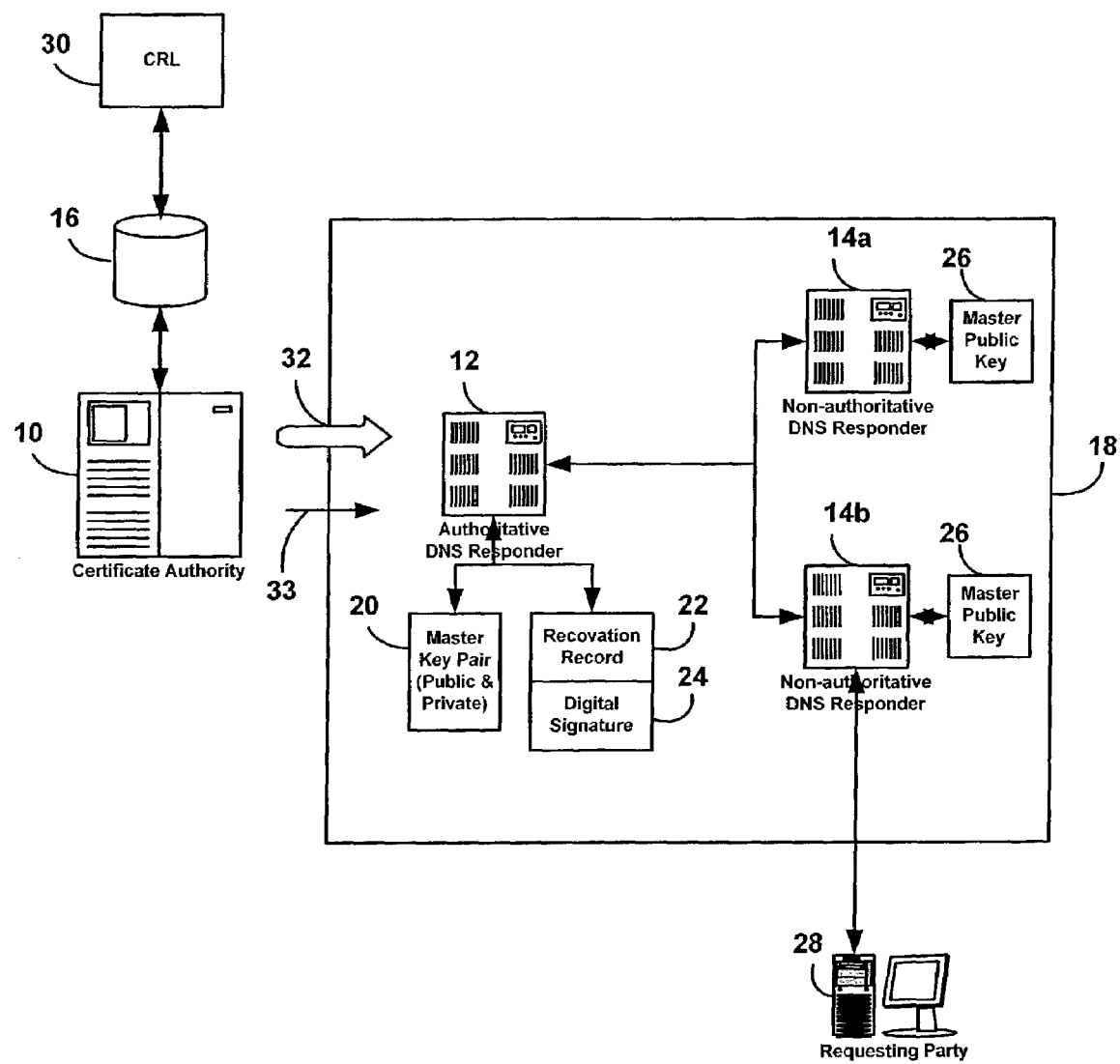
FIG. 1 is a schematic illustrating components of the invention.

As will be appreciated by one skilled in the art, the present invention may be embodied as a method, data processing system, or computer program. Accordingly, the present invention may take the form comprising entirely hardware entirely software or an embodiment combining software and hardware aspects. Furthermore, the present invention may take the form of a computer product on a computer-readable storage medium having computer-readable instructions embodied in the medium. Any suitable computer readable medium may be utilized including hard disks, CD-ROMs, optical storage devices, or magnetic storage devices.

The present invention is described below with reference to flowchart illustrations of methods, functions, apparatus systems and computer programs according to the invention. It will be understood that each block of the flowchart illustrations, and combinations of blocks in the flowchart illustrations, can be implemented by computer readable instructions. These computer readable instructions may be loaded onto a general purpose computer, special purpose computer, or other data processing apparatus to produce a machine, such that the instructions that execute on the computer or other data processing apparatus create means for implementing the functions specified in the flowchart block or blocks.

These computer readable instructions may also be stored in a computer-readable medium that can direct a computer or other data processing apparatus to function in a particular manner, such that the instructions stored in the computer-readable medium produce an article of manufacture including implementation of the functions specified in the flowchart block or blocks or as herein described. The computer readable instructions may also be loaded onto a computer or other data processing apparatus to cause a series of operational steps to be performed on the computer or other processing apparatus to produce a computer implemented process such that the instructions that execute on the computer or other processing apparatus provide steps for implementing the functions specified in the flowchart block or blocks or otherwise herein.

Accordingly, the blocks of the flowchart illustrations can support combinations of means for performing the specified functions, combinations of steps for performing the specified functions, program instruction means for performing the specified functions, or any combination of these. It will also be understood that each block of the flowchart illustrations and other functions described herein, and combinations of the blocks in the flowchart illustrations, can be implemented by special purpose hardware-based computer systems that perform the specified functions or steps, or combinations of special purpose hardware and computer instructions.

The functions or blocks of the flowchart illustrations may be presented in terms of program procedures executed on a computer or a network of computers. These procedural descriptions and representations are the means used by those skilled in the art to most effectively convey the substance of their work to others skilled in the art. A procedure as herein described is generally a self-consistent sequence of steps leading to desired results.

These steps are those requiring physical manipulations of physical quantities. Usually, these quantities take the form of electrical or magnetic signals capable of being stored, transferred, combined, compared or otherwise manipulated. An object or module is a section of computer readable code that is designed to perform a specific task or tasks. Actual computer executable code or computer readable instructions need not be contained with one file or one storage medium. It should be noted that while illustrated as single computers, DNS responders, clients and CA servers can be single computers, server i5 clusters, multiple processors within a single case, or multiple cases. Therefore, the term "DNS responder" is not intended to be limited to a single computer. The term "DNS responder" can be hardware, software or a combination of hardware and software that provides the functionality described herein.

DNS responders are devices that broadcast information for a specific zone of authority. In our case, the DNS responder broadcasts information for its DNS zone that it has received from the CA. A DNS zone is any collection of domain names that has been delegated by a higher authoritative zone. The most authoritative zone is the root zone. For any given zone there exists one, and only one, primary DNS responder.

Referring now to FIG. 1, CA 10 is shown. The CA maintains a certificate revocation list (CRL) 30 within CA information 16. The CRL contains certificates that have been issued by that CA, but have subsequently been revoked. CA 10 is in communication with primary DNS responder 12. The communications connection between the CA and the primary DNS responder need not be physical. Communications can be performed by removable media such as CD-ROM, floppy disk, or other manual means, as well as through direct transmission such as a network connection. Removable media may be preferred, since physically disconnecting the CA from other computers adds additional security to the CA.

Through this communication, the CA can provide the CRL to the primary DNS responder as shown by 32. Additionally, the CA can provide specific or individual revocation information 33 representing the revocation of individual certificates. Revocation information contains the serial number of the certificate as well as the time when the certificate was revoked. Periodically, CRL 30 or individual certificate revocation information 33 is provided to primary DNS responder 12. Upon receipt, this information is parsed into DNS compliant data records. In a CRL, the certificate that has been revoked is identified by its issuer and the serial number that the issuer assigns. The issuer is the CA that signed the certificate, and that CA is typically identified by some "distinguished name". A CRL, therefore, contains information identifying the certificates that a particular CA has revoked.

Certificate revocation information is organized by issuer fingerprint and certificate serial number in a tree structure. This enables rapid lookup of revocation information for any given certificate. Each entry contains a revocation date and optionally a reason the certificate was revoked. Each revocation record is then signed by the master DNS responder to ensure its integrity so that the revocation information is now available in a DNS compliant network. Therefore, the primary DNS responder will have the very latest CA information 16. Secondary DNS responders 14a and 14b can also contain copies of all the data held by the primary DNS responder. This data is stored locally at these machines. For any given DNS zone, there may be any number of secondary DNS responders. Both the primary and secondary DNS responders can be considered authoritative DNS responders for responding to certificate status requests.

The primary DNS responder receives updated information, such as a new CRL from a CA, and notifies all secondary responders. Secondary DNS responders may then periodically poll the primary responder to ensure that information is as up to date as possible. As shown, primary DNS responder 12 and secondary DNS responders 14a and 14b can all provide responses to any certificate status request from requesting party 28.

Each primary DNS responder maintains a cryptographic key pair 20. When the primary DNS responder processes revocation information from a CA, it creates a DNS record 22 to represent that revocation and digitally signs this information with a digital signature 24. This signature is stored along with the revocation information. Whenever a revocation record is provided, the corresponding signature is also provided with the revocation information. This allows anyone receiving the revocation record to use the associated digital signature to authenticate the source of the revocation record.

The secondary DNS responders receive the primary DNS public key 26, which is used to validate any information received from this responder. When the secondary DNS responder replies to a request from a client, it sends the same revocation record, including the signature that it received from the primary DNS responder. The client can then verify the validity of the information received by using the primary DNS responders' public key.

As can be seen, another benefit of this invention is that redundant DNS responders can be easily implemented since the revocation data has been securely signed by a primary DNS responder upon creation of the revocation record. Since the recipient of the information can always authenticate what it receives, revocation data can be safely sent to redundant computers over insecure networks since each individual data element of the transmission can be authenticated. Another benefit to this system is that redundant DNS responders require neither special cryptographic keys nor any extraordinary secure storage.

DNS responders can be arranged hierarchally. Therefore, any DNS responder knows the authoritative responders upstream that can assist in responding to queries for revoked certificates.

DNS responders may also cache information to improve the response to subsequent similar queries for revocation information. Since the individual responses are signed and self-contained, they are safe to cache and can be verified independently regardless of which DNS responder provides the response. In the event that a client receives a response that indicates a certificate has not been revoked, there is a potential time window, within which, this certificate could have been revoked. For this reason, an administrator determines the length of time that a record lives in the cache. Once that time has expired, the record is deleted from the cache, and the query will be to a DNS responder that will have more up to date revocation information.

Figure 2:
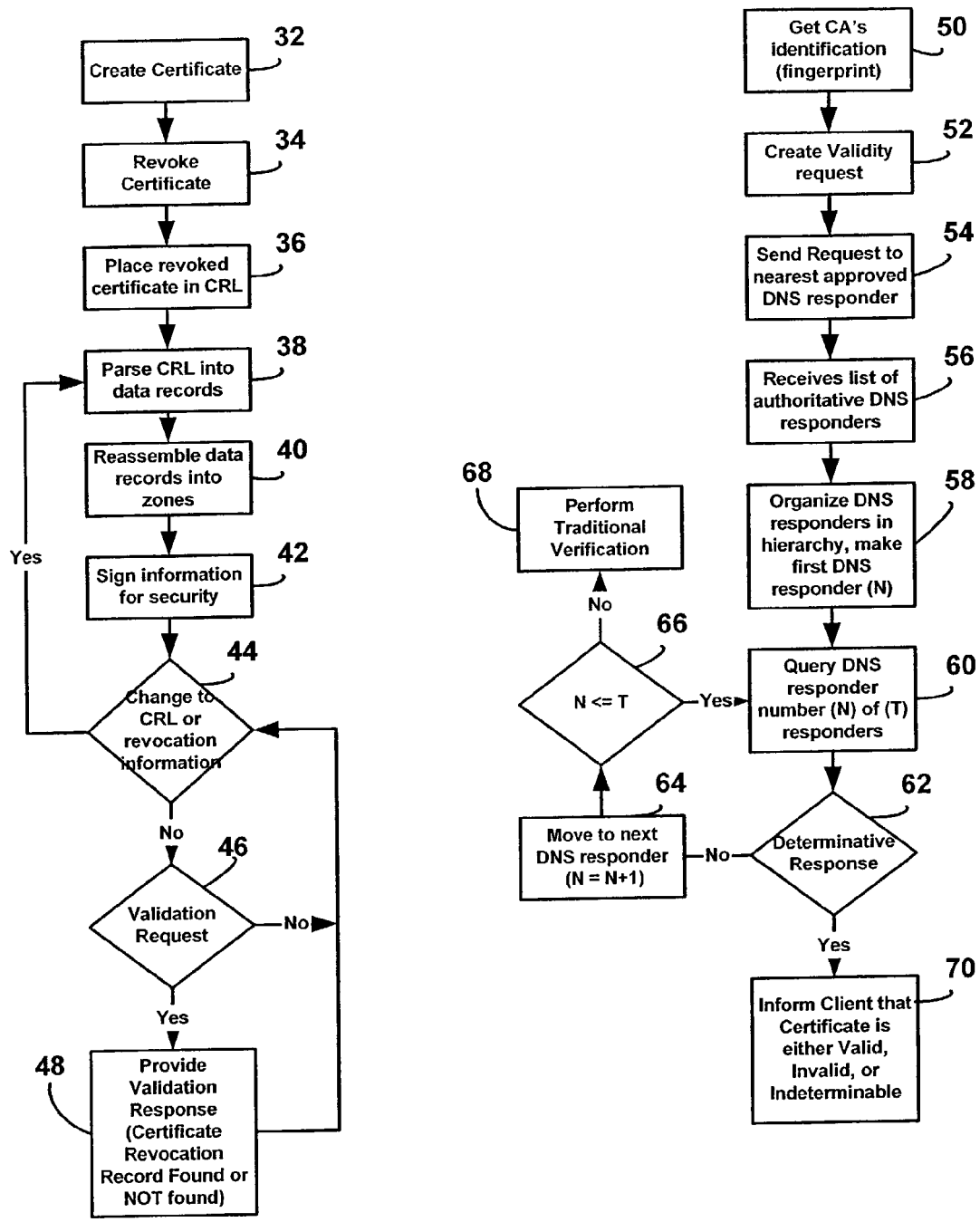
FIG. 2 is flowcharts illustrating the invention.

Referring now to FIG. 2, the process begins when the CA creates a certificate in step 32. The certificate is then used for security purposes under normal operation. At some point, however, the certificate may need to be revoked as shown in step 34. The CA then places the certificate in the CRL of that CA in step 36. Alternatively, the CA can provide the revocation information to the authoritative DNS responder. In either case, the authoritative DNS responder receives revocation information from the CA. The DNS responder then parses the revocation information into one or more data records in step 38, reassembles the data records by DNS zone information in step 40 and may cryptographically sign the information in step 42. Subsequently, if a change is made to the CRL or additional revocation information is received in step 44, the process returns to step 38. Otherwise, the DNS responder awaits a certificate validation request from a client or other device in step 46. If a validation request is received, the DNS responder provides the validation response in step 48. Otherwise, the DNS responder waits until it receives another certificate status request or additional revocation information.

When client 28 wishes to check the validity of a certificate, the client determines the identity or fingerprint of the CA or certificate issuer of the certificate in step 50. The client then creates a certificate status request to send to a DNS responder for determining the validity of the certificate in step 52. This request is then issued to the nearest approved DNS responder at step 54. The client can receive a list of responders known to be authoritative for certificate revocations for that CA in step 56. The client can also be informed as to the total number (T) of authoritative DNS responders available to query. The client then queries the first DNS responder in step 60. For purposes of this application, (N) is used to denote the next DNS responder to query. Therefore, for the first query to the first DNS responder, N:=1. If an authoritative response is not received in step 62, the client prepares to query the next DNS responder (N:=N+1) in step 64. If there are no more responders in step 66, the client can optionally perform the traditional verification in step 68. Based upon the outcome of that verification, the user can respond in the same manner as described below. If, in step 62, a determinative response has been received, there are two possible outcomes. In step 70, if a certificate revocation record is discovered, then the certificate has been revoked, but if the certificate revocation record is not discovered, the presumption is that the certificate is valid.

In the event that all DNS responders have been queried and no satisfactory response has been received, the validation request can also be deemed inconclusive. At that point the user may wish to handle this situation in one of several possible ways. The application may deem the certificate invalid and act as if there has been an actual revocation. The application may deem the certificate valid and act as if an affirmative verification were received. The user may instead be prompted by the application at the client level allowing the user to determine the next course of action. The software on the client may also attempt verification of the certificate by attempting to locate the CRL or other revocation indicator. It should be noted that in the event that the traditional verification process is also inconclusive, the user still has not received any information as to the certificate's validity.

When a determinate response is received, there are also several possible outcomes for the user of the client computer. If the response is returned as valid, then the certificate has not been revoked and the user of client 14 knows definitively that the certificate is valid in this respect. For this to be true, it is also necessary that the response from the DNS responder be cryptographically verified in order to assure that the DNS responder is authentic. If such a cryptographically verified response indicates that a certificate has been revoked, then the user knows definitively that the certificate is revoked and can take the appropriate action. In the event that a response is returned from the DNS responder but the response is not cryptographically verified, the appropriate response is to act as if the DNS responder failed to respond and to query the next DNS responder in order. In the event that no DNS responder returns a cryptographically verified response, then the user is left with the situation where no determinate response exists.

Figure 3:
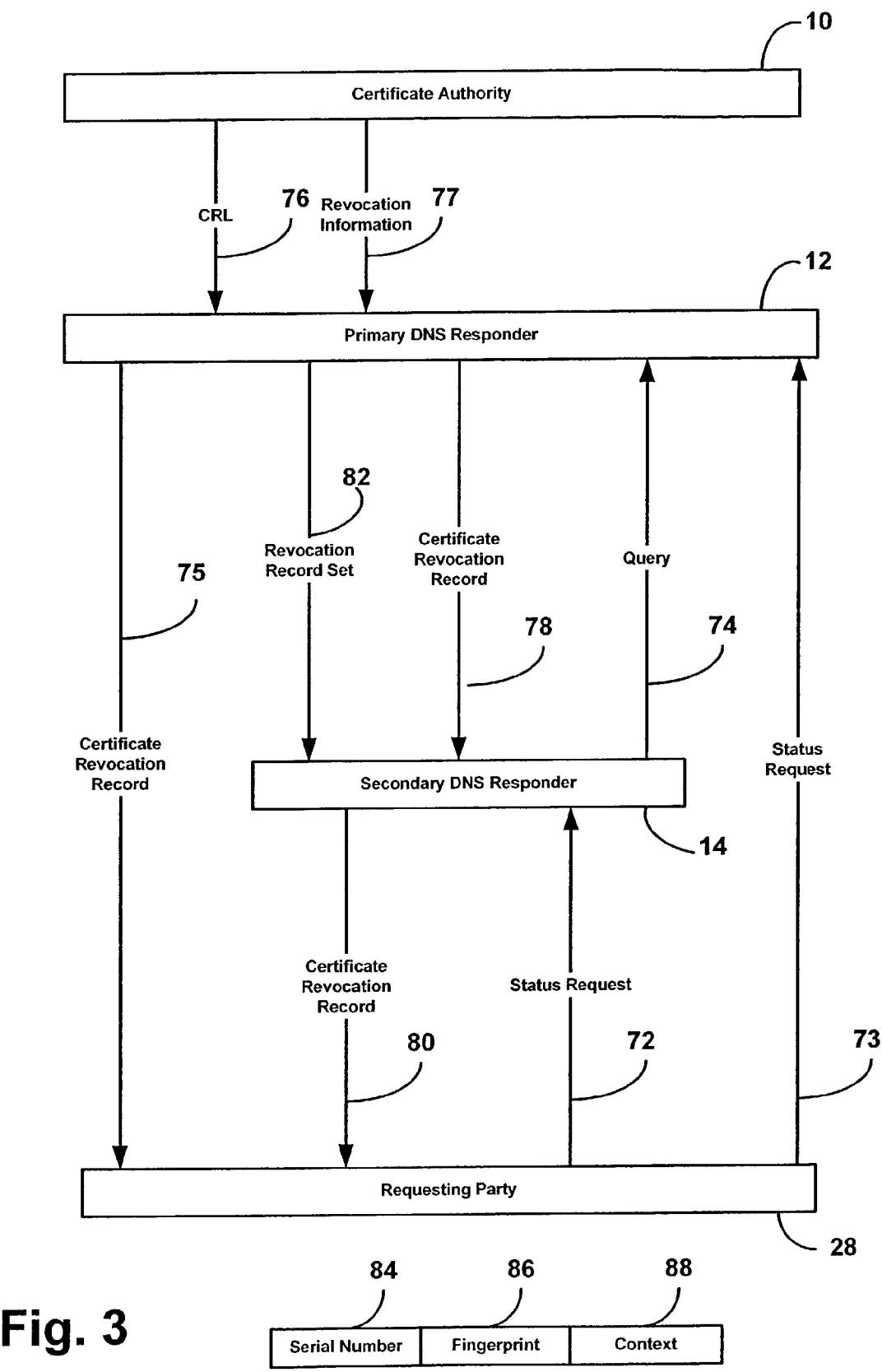
FIG. 3 is a schematic of the data flow of the invention.

Referring now to FIG. 3, the flow of information associated with this invention will be described in more detail. The process begins when requesting party 28 has a need to determine the status of an electronic certificate and particularly whether it has been revoked. In the event that it is necessary to make such a determination, a certificate status request 73 is transmitted to the primary DNS responder 12. The primary DNS responder then queries a set of certificate revocation records, local to the primary DNS responder, associated with the certificate status request. In the event that a certificate revocation record 75 is discovered, it is transmitted back to the requesting party 28. The requesting party receives the revocation record, including revocation information, and can make informed decisions concerning the validity of the particular digital certificate. In the event that a secondary DNS responder 14 is queried by the responding party 28, rather than the primary DNS responder 12, certificate status request 72 is transmitted to the slave DNS responder 14. At this point, the secondary DNS responder 14 can query its local version of the set of certificate revocation records and discover if the certificate being requested is in this set of revocation records. In the event that the revocation record is discovered, certificate revocation record 80 is transmitted back to the requesting party and the requesting party is provided with revocation information according to certificate status request 72.

The secondary DNS responder 14 also queries the primary DNS responder 12, through query 74, at some predetermined interval to receive updates to the set of certificate revocation records contained locally at secondary DNS responder 14. In this case, primary DNS responder 12 sends an updated set of certificate revocation records to the secondary DNS responder 14.

In order for the primary DNS responder to have the set of certificate revocation records, the certificate authority 10 provides a certificate revocation list 76 or other revocation information 77 to primary DNS responder 12. The primary DNS responder then parses the certificate revocation list to create a set of certificate revocation records. Primary DNS responder 12 can also update the set of certificate revocation records when it receives other revocation information 77. Primary DNS responders can also include DNS zone information within the set of certificate revocation records. Therefore, the primary DNS responder can contain the revocation records for the revoked certificates for the DNS zone associated with the primary DNS responder. This revocation record set 82 can be passed to secondary DNS responder 12 so that each DNS responder contains the necessary information to inform the requesting party the status of an electronic certificate and can provide authoritative responses to such requests. In the preferred embodiment of this invention, the revocation record is of the CERT type as described in Request for Comment document 2538. The OID private type is used to store the revocation record information. Therefore, the algorithm field would need to contain zero for the private format data type of the CERT record type.

Revocation records should be stored in the namespaces associated with the certificate authorities. The location of the revocation record is organized by serial number 84 (FIG. 3), issuer 86, and context 88 and is represented by [serial number].[issuer].[context]. Context is global context for the preferred embodiment, which is for global certificate revocations, and is represented by "_rev". The issuer portion of the name is an alphanumeric representation of the certificate for the certificate authority or entity issuing certificates. This alphanumeric representation is the fingerprint of the certificate authority's issuing certificate. For example, assume that the fingerprint of the issuer's certificate is a1efb4bdde08of0E6DB4218E1012E3B427A35775. This fingerprint can be represented by a1ef.b4bd.de08.bf0e.6db4.218e.1012.e365.2713.5775 in dotted decimal format. The insertion of decimals to separate the fingerprint and serial number into octets is referred to as the dotted decimal format. Although not required, the dotted decimal format allows for the DNS look-up processes to quickly identify the existence of a revocation record. However, any DNS look-up format can be used.

Each certificate has associated with it a serial number. Generally, this serial number is in decimal format. If the serial number is 147430, the hexadecimal translation is 0002.3fe6. To discover a revocation record for the certificate in this embodiment, the following information, in dotted decimal format, can be included in the certificate status request:

"0002.3fe6.a1ef.b4bd.de08.of0e.6db4.218e.1012.e364. 2713.5775._rev". As shown, the serial number is converted into two hexadecimal octets in the dotted decimal format and can be combined with the fingerprint. This is accomplished by converting the decimal version of the serial number to hexadecimal and appending the fingerprint. Although not a requirement for utilizing DNS look-up, the hexadecimal format is more convenient.

By organizing certificate revocation records in the [serial number].[issuer].[context]. format, an advantageous look-up method is created as DNS look-up can be employed. This method has significant advantages over the traditional query through an entire Certification Revocation List. As DNS look-up provides a means for providing a tree-based structure for faster searching, the use of the serial number and fingerprint combination allows for taking advantage of this tree searching method. The fingerprint allows the look-up to quickly discover the issuing entity and the serial number will be organized in numeric order allowing rapid discovery of the certificate sought. Additionally, Domain Name System Security Extensions can be used to allow a requesting party to authenticate the responses to certificate status requests.

By providing the above invention, there is significant improvement in the ease of using and managing certificates. Revocation queries are more efficient, since the only transmission necessary to determine whether a certificate has been revoked is a single query to a DNS responder. This query is then answered with a single response. Since it is not necessary to download the CRL, a significant disadvantage of the current approach is eliminated. It is not necessary to access and parse large, unindexed CRL's from multiple CA's each time the status of a certificate is requested. While real-time certificate revocation systems do exist, they require unique cryptographic signatures to be dynamically created for each query to a CA. This increases the demand for the responding server which, in turn, requires more expensive hardware or specialized cryptographic hardware to meet this demand. These disadvantages contribute to the non-acceptance and limited use of such traditional verification systems. The benefit of using the DNS responder is that the cryptographic signatures for all responses are calculated once and included in all responses. They are verifiable singly and do not vary from query to query.

While a preferred embodiment of the invention has been described using specific terms, such description is for illustrative purposes only, and it is to be understood that changes and variations may be made without departing from the spirit or scope of the following claims.

What is claimed is:

1. A system for verifying the status of an electronic certificate having a serial number comprising:
 a computer readable medium;
 a set of certificate revocation records, derived from a certificate authority, contained in said computer readable medium;
 a set of computer readable instructions embodied in said computer readable medium for receiving a certificate status request for the electronic certificate from a requesting party, determining a fingerprint for the electronic certificate's issuer, appending said fingerprint to said serial number, formatting said serial number and appended fingerprint into a dotted decimal format, including said serial number and said fingerprint in dotted decimal format within said certificate status request, querying said set of certificate revocation records having revocation information representing the status of the electronic certificate embodied in said computer readable medium according to said certificate status request, and, transmitting said revocation information to the requesting party if said certificate revocation record is successfully retrieved from said set of certificate revocation records so that said requesting party can be informed of the status of the electronic certificate.

2. The system of claim 1 wherein said computer readable medium is embodied in a primary DNS responder.

3. The system of claim 2 wherein said set of computer readable instructions include instructions for receiving certificate revocation information from said certificate authority; parsing said certificate revocation information and adding revocation records to said set of certificate revocation records according to said certificate revocation information received from said certificate authority.

4. The system of claim 3 wherein said certificate revocation information is a certification revocation list provided by said certificate authority.

5. The system of claim 1 wherein said computer readable medium is embodied in a secondary DNS responder.

6. The system of claim 5 wherein said computer readable instructions include instructions for receiving a primary set of certificate revocation records from a primary DNS responder and updating said set of certificate revocation records according to said primary set of certificate revocation records.

7. The system of claim 1 including:
a digital signature associated with said computer readable medium; and,
said set of computer readable instructions include instructions for digitally signing said revocation information with said digital signature associated with said computer readable medium so that said requesting party can authenticate said revocation information.

8. A system for verifying the status of an electronic certificate having an associated serial number comprising:
a computer readable medium; and,
a set of computer readable instructions embodied within said computer readable medium for receiving a certificate revocation list from a certificate authority, determining a fingerprint of said certificate authority, associating said fingerprint with said serial number for each certificate represented by said certificate revocation list, formatting said fingerprint and serial number into a dotted decimal format, associating said fingerprint and said serial number within said set of certificate revocation records, creating a set of certificate revocation records, each having revocation information representing revoked electronic certificates, according to said certificate revocation list, organizing said set of certificate revocation records by DNS zone, and, making available said set of certificate revocation records to requesting parties so that the requesting parties can determine the status of a particular electronic certificate organized by DNS zone.

9. The system of claim 8 wherein said computer readable medium is embodied within a primary DNS responder.

10. The system of claim 9 wherein said set of computer readable instructions include instructions for providing said set of certificate revocation records to at least one secondary DNS responder.

11. The system of claim 9 including:
a digital signature associated with said primary DNS responder; and,
said set of computer readable instructions include instructions for electronically signing certificate revocation records with said digital signature prior to making available said set of revocation records to requesting parties.

12. A system for verifying the status of an electronic certificate comprising:
a computer readable medium; and,
a set of computer readable instructions contained within said computer readable medium for creating a certificate status request having certificate authority information, querying a DNS responder for a DNS responder list representing DNS responders having a set of certificate revocation records according to said certificate authority information, receiving said DNS responder list, querying each DNS responder according to said certificate status request until the exhaustion of said DNS responder list, receiving certificate revocation information from said certificate revocation record from said queried DNS responders if said certificate revocation record is discovered, and providing certificate revocation information according to said requesting party if said certificate revocation record is discovered so that the requesting party is provided the status of the certificate according to said certificate revocation request.

13. The system of claim 12 including a fingerprint of the certificate's issuer associated with the electronic certificate embodied within said certificate status request.

14. The system of claim 12 including a serial number associated with the electronic certificate embodied within said certificate status request.

15. The system of claim 12 including:
a fingerprint of the certificate's issuer associated with the electronic certificate embodied within said certificate status request;
a serial number associated with said electronic certificate embodied within said certificate status request; and,
said fingerprint and said serial number are in dotted decimal format.

16. A system for verifying the status of an electronic certificate comprising:
a computer readable medium; and,
a set of computer readable instructions contained within said computer readable medium for creating a certificate status request having certificate authority information, querying a DNS responder for a DNS responder list representing DNS responders having a set of certificate revocation records according to said certificate authority information, receiving said DNS responder list, querying each DNS responder according to said certificate status request until the exhaustion of a predetermined period of time in which said certificate revocation record is not discovered that is responsive to said certificate status request, receiving certificate revocation information from said certificate revocation record from said queried DNS responders if said certificate revocation record is discovered, and providing certificate revocation information to a requesting party if said certificate revocation record is discovered so that the requesting party is provided the status of the certificate according to said certificate revocation request.

17. The system of claim 16 including a fingerprint of the certificate's issuer associated with the electronic certificate embodied within said certificate status request.

18. The system of claim 16 including a serial number associated with the electronic certificate embodied within said certificate status request.

19. The system of claim 16 including:
a fingerprint of the certificate's issuer associated with the electronic certificate embodied within said certificate status request;
a serial number associated with said electronic certificate embodied within said certificate status request; and,
said fingerprint and said serial number are in dotted decimal format.

20. A system for verifying the status of an electronic certificate comprising:
a computer readable medium;
a set of computer readable instructions contained within said computer readable medium for creating a certificate status request having certificate authority information and a fingerprint of the certificate's issuer associated with the electronic certificate and a serial number associated with said electronic certificate, formatting said fingerprint and said serial number in dotted decimal format, querying a DNS responder for a DNS responder list representing DNS responders having a set of certificate revocation records according to said certificate authority information, receiving said DNS responder list, querying each DNS responder according to said certificate status request until a termination event is encountered, receiving certificate revocation information from said certificate revocation record from said queried DNS responders if said certificate revocation record is discovered, and, providing certificate revocation information to a requesting party if said certificate revocation record is discovered so that the requesting party is provided the status of the certificate according to said certificate revocation request.

* * * * *